United States Patent [19]

Mohlenkamp

[11] Patent Number: 5,605,358
[45] Date of Patent: Feb. 25, 1997

[54] TUBE COUPLING

[75] Inventor: Michael J. Mohlenkamp, University Heights, Ohio

[73] Assignee: Cajon Company, Macedonia, Ohio

[21] Appl. No.: 543,172

[22] Filed: Oct. 13, 1995

[51] Int. Cl.⁶ ................................................. F16L 35/00
[52] U.S. Cl. ........................ 285/39; 285/328; 285/353; 285/388
[58] Field of Search ................................. 285/328, 353, 285/354, 386, 387, 388, 384, 39

[56] References Cited

U.S. PATENT DOCUMENTS

| | | | |
|---|---|---|---|
| 473,462 | 4/1892 | Hogan | 285/384 |
| 762,350 | 6/1904 | Rehnstrom | 285/386 |
| 793,209 | 6/1905 | Miller . | |
| 932,805 | 8/1909 | McLaughlin . | |
| 1,244,100 | 10/1917 | Kortas . | |
| 2,226,914 | 12/1940 | Sharon . | |
| 2,310,490 | 2/1943 | Melsom . | |
| 3,515,415 | 6/1970 | Clark et al. . | |
| 3,929,358 | 12/1975 | Eckhardt . | |
| 4,613,161 | 9/1986 | Brisco | 285/387 X |
| 4,907,830 | 3/1990 | Sasa et al. | 285/388 X |
| 5,152,499 | 10/1992 | Silverman et al. . | |
| 5,226,678 | 7/1993 | Petranto . | |

*Primary Examiner*—Dave W. Arola
*Attorney, Agent, or Firm*—Fay, Sharpe, Beall, Fagan, Minnich & McKee

[57] ABSTRACT

A tube coupling assembly includes first and second generally cylindrical coupling components each terminating in a radially outwardly extending flange surrounding a sealing end face. The coupling components are positioned in axial alignment and an improved nut assembly is provided for selectively driving the sealing end faces toward one another. The nut assembly comprises a sleeve-like main body positioned in surrounding relationship to the first and second coupling components. A nut member is threadedly connected with a first end of the main body and engages with the radially outwardly extending flange on the first coupling component on the side opposite its sealing face. A split-ring connector comprising cooperating half-ring members is positioned in surrounding relationship to the second end of the main body and releasably connected thereto. The half-ring members include radially inwardly extending flanges engaged with the radially outwardly extending flange on the second coupling component on the side opposite its sealing face.

13 Claims, 2 Drawing Sheets

TUBE COUPLING

BACKGROUND OF THE INVENTION

The subject invention is directed toward the art of tube fittings and couplings and, more particularly, to an improved coupling nut assembly.

The invention is particularly useful for allowing female coupling nuts to be installed on integral glands carried on flow system devices, such as valves.

One commonly used tube fitting for vacuum and high purity gas systems is a face seal arrangement using cylindrical gland elements having end flanges and sealing end faces. The gland elements are driven toward one another by cooperating, threadedly connected male and female nut members that engage the gland elements behind the end flanges. A fitting of the general type under consideration is shown in commonly assigned U.S. Pat. Nos. 3,521,910; 4,552,389; 4,650,227; and 5,145,219.

In certain situations, it is highly desirable to have the gland elements effectively constitute an integral part of a flow system device, such as a valve. In such instances, one of the two cooperating nut members must be captured on the gland element formed on the flow system device. That is, the nut member, normally the female nut member, must be located between the end flange on the gland and the body of the flow system device. In the past, this has been achieved by locating the female nut on a small separate gland element and then welding the gland element to the flow system device. Alternatively, the female nuts have been provided with various connectors, such as slide wires, to allow them to be moved over the end flanges on the gland element and connected thereto after formation of the gland element on the flow system device (see, for example, U.S. Pat. Nos. 5,152,499 and 2,310,490).

Each of the above-discussed methods of forming an integral gland member and attaching an associated female nut on a flow system device has certain disadvantages. For example, both of the methods result in present manufacturing problems. In addition, with some of the connector systems, the space requirements are excessive.

SUMMARY OF THE INVENTION

The subject invention overcomes the above-noted problems and provides a coupling assembly that is useful in a variety of environments but, in particular, allows the coupling nuts to be joined to gland members formed as an integral component of a variety of flow system devices, such as valves and the like.

In particular, and in accordance with the subject invention, there is provided a tube coupling assembly that includes first and second, generally cylindrical coupling components each terminating in a radially, outwardly extending flange surrounding a sealing end face. The coupling components are positioned in axial alignment and an improved nut assembly acts for selectively driving the sealing end faces toward one another. The improved nut assembly includes a sleeve-like main body terminating in first and second ends and positioned in surrounding relationship to the first and second coupling components. A nut member is threadedly connected with the first end of the main body and engages with the radially outwardly extending flange on the first coupling component on the side opposite the sealing end face. Associated with the sleeve-like member at its second end is a split-ring connector comprising cooperating half-ring members positioned in surrounding relationship to the second end of the main body and releasably connected thereto. The half-ring members include radially inwardly extending flanges engaged with the radially outwardly extending flange on the second coupling component on the side opposite its sealing end face.

In accordance with a further and more limited aspect of the invention, the half-ring member and the main body include interengaged portions that act to prevent axial movement of the half-ring members relative to the main body. In addition, means are provided to prevent undesired separation of the half-ring members from their cooperating connected or engaged position.

In accordance with yet another aspect of the invention, it is preferred that the interengaged portions between the half-ring members and the sleeve-like main body comprise a cooperating circumferential groove and a radial flange. In its preferred form, the groove is formed about the outer surface of the sleeve-like main body and the flange extends inwardly from the half-ring members.

Because of the cooperating relationship between the sleeve-like main body and the half-ring members, the elements function as a female nut member and can be readily installed over a gland type coupling component even in those instances where the gland forms an integral part of some other fluid flow device. That is, the female nut member can be moved into position from the sealing end face portion of the cylindrical coupling component and the half-ring members subsequently installed.

Preferably, the half-ring members are maintained in their mated relationship by a suitable locking or connecting mechanism that encircles the half-ring members and prevents their undesired separation. The locking means can be permanently installed or it can be a removable component that allows subsequent disassembly of the female nut defining portion from the gland if such is desired.

As can be seen from the foregoing, a primary object of the invention is the provision of a tube coupling assembly wherein the portion of the assembly that defines the female nut member is adapted to be installed on a coupling gland member by being moved axially thereon from either end of the coupling member. This greatly increases the usefulness of such an assembly and allows incorporation of coupling components directly into flow system devices with a minimum of problems.

As can be seen from the foregoing, the primary object of the invention is the provision of an improved face seal type coupling assembly that offers various options with respect to installation and use.

A further object of the invention is the provision of an assembly of the type described that is relatively simple to manufacture and use.

A further object is the provision of a coupling assembly wherein the female nut member is defined by a combination of elements that allow the nut to be assembled to the associated coupling components from either end.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
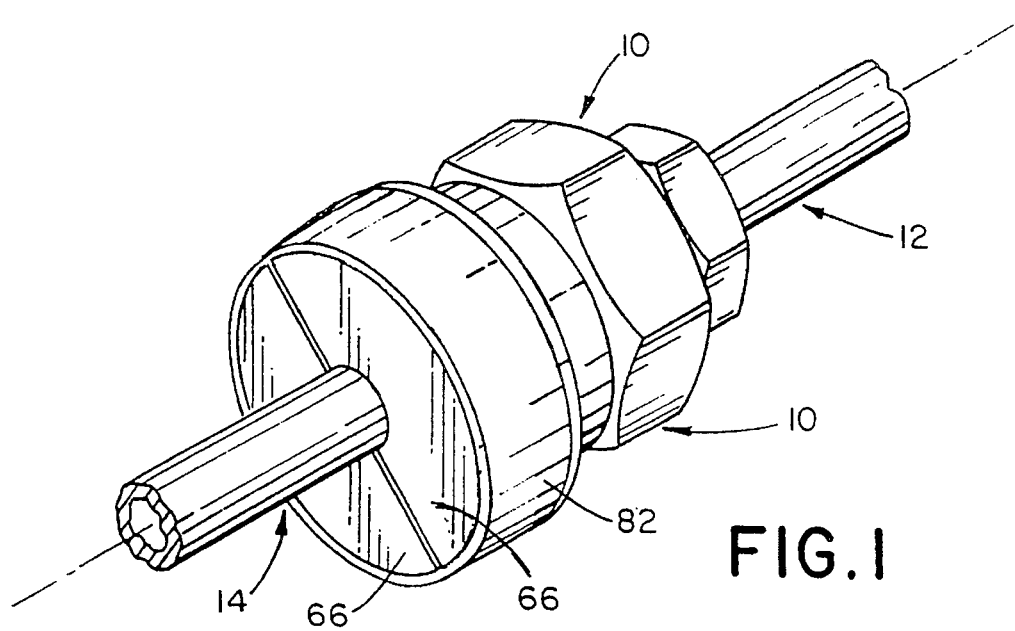
FIG. 1 is an isometric view of a tube coupling assembly formed in accordance with the preferred embodiment of the invention.
Figure 2:
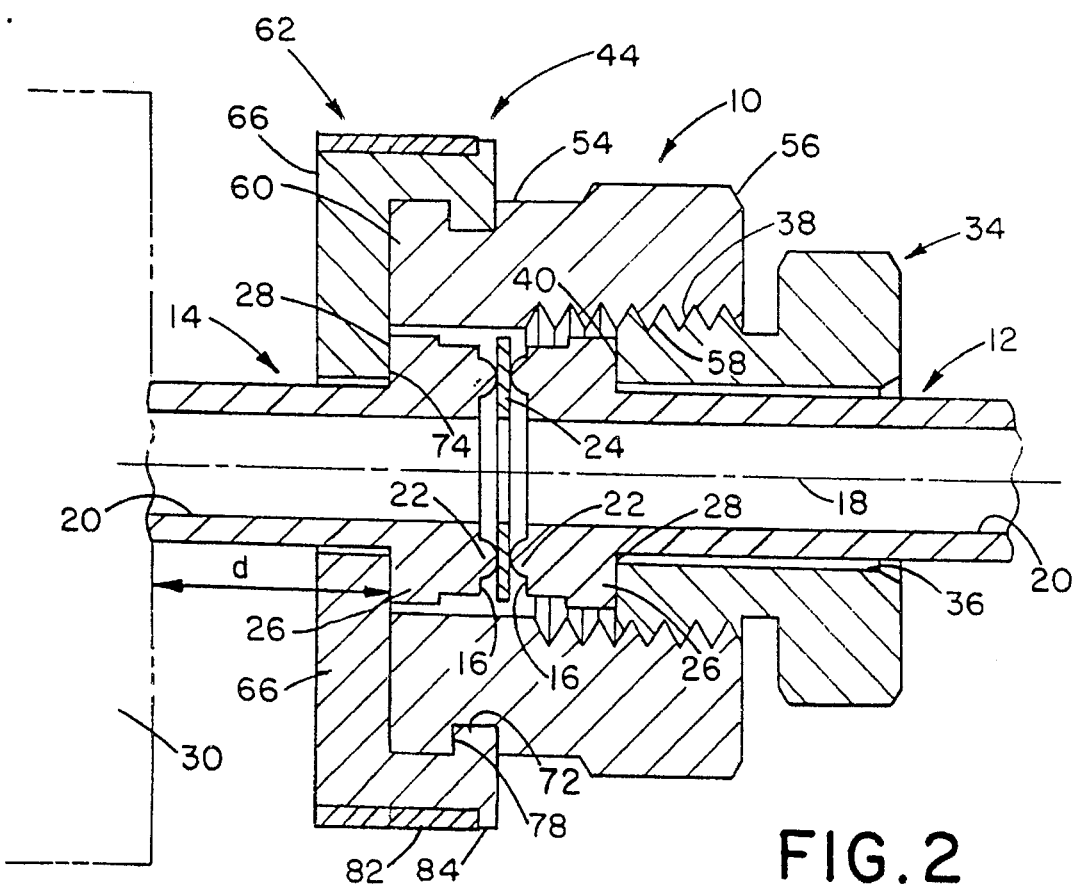
FIG. 2 is a longitudinal cross-sectional view of the assembly of FIG. 1 but showing the assembly joined to a flow system device (the flow system device is indicated generally in phantom form); and, FIG. 3 is an exploded isometric view of the coupling assembly of FIG. 1.
Figure 3:
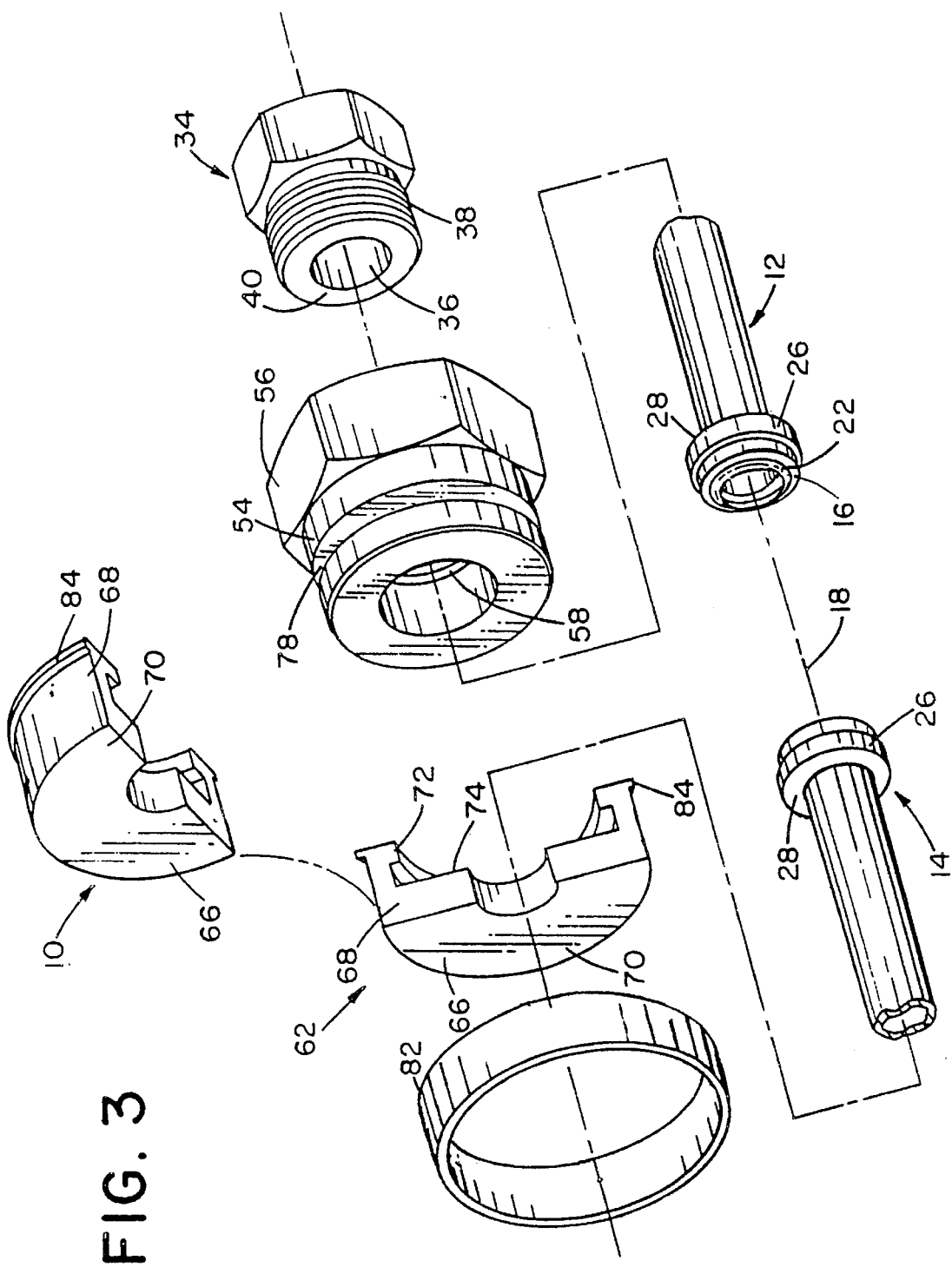

Referring now to the drawings wherein the showings are for the purposes of illustrating the preferred embodiment of the invention only and not for purposes of limiting same, FIGS. 1–3 generally indicate the coupling assembly 10 as being comprised of a pair of first and second generally cylindrical, gland type coupling components 12 and 14. Each of the coupling components are formed, for example, from a stainless steel. They are substantially identical and include a sealing end face 16 which generally is in a plane perpendicular to the central axis 18. Each of the coupling components 12, 14 is additionally shown as including a central cylindrical flow passage 20. One or the other could, in certain situations, be solid to function as an end seal.

The sealing end faces 16 can be of any of a variety of well known types, but are shown as including a circumferentially continuous, axially extending sealing bead 22. The beads 22 are arranged to engage on opposite sides of an annular metal gasket 24 in a manner well known in the art. The components thus far described are generally shown and described in some detail in U.S. Pat. Nos. 3,521,910; 4,552,389; 4,650,227; and 5,145,219.

In the subject embodiment, each of the coupling components 12, 14 further include a radially extending flange 26 that defines a radial flange face 28 that lies in a plane perpendicular to axis 18.

As previously discussed, the coupling components can be formed as independent members and subsequently welded or otherwise joined to the associated tubing or fluid system components. In many instances, it is, however, desirable to have one or the other of the two components formed as an integral part of the associated flow system device. This has been accomplished generally in the past by welding the coupling component to the flow system device at the time of manufacture of the flow system device. When this is done, one or the other of the nut components of the coupling must be installed on the coupling component prior to its being welded to the remaining portions of the flow system device. This sometimes requires a certain amount of additional space for the welding to take place and sometimes results in a flow system device which has a greater size than desired. For example, referring to FIG. 2, the dimension d between the flow system device 30, illustrated in phantom only, and the face 28 of coupling component 20 must be a certain specified minimum in order to assure that the welding operation can take place. This can result in the coupling component extending outwardly a greater distance than desired. In addition, the elimination of the welding results in a more desirable and improved fitting since welding can produce impurities that must be removed as well as sometimes producing protrusions that affect flow or act as fluid retention areas. Moreover, the welding is a relatively critical and expensive manufacturing step.

In the subject arrangement, these problems are overcome by the inventive design and arrangement of the coupling nuts. In particular, the subject assembly uses a male coupling nut 34 which has a central opening 36 sized so as to freely receive the reduced diameter tubular end portion of the associated tube coupling member 12. A first end 38 of the male nut member 34 is provided with suitable external threads and terminates in an end face 40 that is in a plane perpendicular to the longitudinal axis of the nut member and is arranged, when assembled about the gland member 12, to engage the shoulder face 28 of flange 26 in the manner illustrated in FIG. 2. The male nut member 34 is thus adapted to be cooperatively engaged with the female nut assembly 44 to drive the sealing end faces axially toward one another and into sealing engagement with the gasket member 24.

The female nut assembly 44 cooperates with male nut member 34 and generally includes a sleeve-like cylindrical main body 48 that is sized so as to freely receive the flanged end portions of the cooperating coupling components 12, 14 in the manner illustrated. The interior of the main body 14 is provided at its first end 56 with internal threads 58 adapted to closely receive the threads 38 on the male nut member 34.

At the second end 60 of the main body 54, there is provided a split-ring connector assembly 62 that acts to provide radially inwardly extending flanges for engagement with the flange surface 22 on coupling component 14 such that when the male nut member 34 is tightened into its position within the sleeve-like body 54, suitable compressive forces are applied to the coupling components 12, 14 to drive them into the required sealing relationship with the gasket 24.

In the preferred embodiment, the split-ring connector assembly 62 generally comprises a pair of cooperating, identically conformed half-ring members 66 Each of the half-ring members 66 are preferably formed from a suitable metal such as stainless steel and have the configuration best seen in FIG. 3. Note that the half-ring members each include a semi-cylindrical main body 68 terminating in radially inwardly extending end flange portions 70, 72. It is preferred that end flange 70 extend inwardly substantially to the outer diameter of the associated coupling component 4 as can be seen in FIG. 2. This allows the interior face 74 of the end flange 70 to engage with the planar end or shoulder face 28 on the flange 26 of coupling component 14.

Flange 72 provides means for joining the half-rings 66 to the sleeve-like main body 54 in a manner which prevents axial relative movement between the half-ring members 66 and the main body 54. In this regard, the main body 54 is provided with a circumferentially continuous grooves 78 that is sized and located so as to receive the flange 72 in a manner best seen in FIG. 2. It can be appreciated, however, that the half-ring members 66 can be installed and removed from the assembled position shown in FIG. 2 without requiring that the female nut assembly be moved into position on the coupling nut member 14 in any particular direction. That is, the sleeve by itself can be moved into position to the location generally shown in FIG. 2 and the half-ring members 66 moved into the located and engaged position. When in this position, however, means must be provided to either permanently or semi-permanently maintain the split-rings so located and assembled. Many different arrangements could be provided in order to achieve this desired result. In the subject invention, however, continuous flat sleeve ring 82 is assembled over the half-ring members in their mated position. The continuous flat ring 82 is assembled to half-ring members 66 by being press-fit thereover. Alternatively, thermal shrink fitting of the ring 82 to the half-ring members could also be used to provide a suitable connection. Axial movement of the ring 82 in the right-hand direction, as viewed in FIG. 2, is limited by a small, outwardly extending flange 84 formed on each half-ring member 66.

It should, of course, be understood that various other arrangements could be used for maintaining the half-ring members in their desired located position. Such arrangements could even include deformed rings, bonding, or mechanical fasteners.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a tube coupling assembly including first and second generally cylindrical coupling components each terminating in a radially outwardly extending flange surrounding a sealing end face, the coupling components positioned in axial alignment, an improved nut assembly for selectively driving the sealing end faces toward one another, said improved nut assembly comprising:

a sleeve-like main body positioned in surrounding relationship to said first and second coupling components, said sleeve-like main body terminating in first and second ends;

a nut member threadedly connected with the first end of the main body and engaged with the radially outwardly extending flange on the first coupling component on the side opposite its sealing face; and, a split-ring means comprising cooperating half-ring members positioned in surrounding relationship to the second end of the main body and releasably connected thereto, said half-ring members including radially inwardly extending flanges engaged with the radially outwardly extending flange on the second coupling component on the side opposite its sealing face.

2. The tube coupling assembly as defined in claim 1 wherein the cooperating half-ring members are releasably connected to the second end of the main body by a retainer ring that encircles said half-ring members.

3. The tube coupling assembly as defined in claim 1 wherein the half-ring members and the main body include interengaged portions to prevent axial movement of the half-ring members relative to the main body.

4. The tube coupling assembly as defined in claim 3 wherein the interengaged portions include a circumferential groove formed in one of said main body and said split-ring means.

5. The tube coupling assembly as defined in claim 3 wherein the interengaged portions include a circumferential groove and a radial flange.

6. The tube coupling assembly as defined in claim 3 wherein the sleeve-like main body has internal thread on the first end and the nut member is received in said internal threads.

7. The tube coupling assembly as defined in claim 1 wherein the main body and the nut member have wrench flats formed on the exterior thereof.

8. The tube coupling assembly as defined in claim 7 wherein the split-ring means extends circumferentially about the second end of the sleeve-like member.

9. In a tube coupling assembly including first and second generally cylindrical coupling components positioned in axial alignment and each terminating in a radially outwardly extending flange surround a sealing end face, an improved nut assembly for selectively driving the sealing end faces toward one another, said improved nut assembly comprising:

a sleeve-like main body positioned in surrounding relationship to the first and second coupling components, the sleeve-like main body terminating in first and second ends;

a nut member threadedly connected with the first end of the main body and engaged with the radially outwardly extending flange on the first coupling component on the side opposite its sealing face; and, a split-ring connector comprising cooperating connector members positioned in surrounding relationship to the second end of the main body and releasably connected thereto, said connector members including radially inwardly extending flanges engaged with the radially outwardly extending flange on the second coupling component on the side opposite its sealing face.

10. The tube coupling assembly as defined in claim 9 wherein the cooperating connector members are half-ring members releasably connected to the second end of the main body.

11. The tube coupling assembly as defined in claim 10 wherein the half-ring members and the main body include interengaged portions to prevent axial movement of the half-ring members relative to the main body.

12. The tube coupling assembly as defined in claim 9 wherein the nut member has external threads engaged with internal threads in the first end of the main body.

13. The tube coupling assembly as defined in claim 11 wherein the interengaged portions include a circumferential groove and a radial flange.

* * * * *